(12) United States Patent
Cho et al.

(10) Patent No.: US 9,964,082 B2
(45) Date of Patent: May 8, 2018

(54) DIESEL FUEL FILTER FOR VEHICLE

(71) Applicants: Hyundai Motor Company, Seoul (KR); UFI Filters Korea Limited, Gimpo, Gyeonggi-do OT (KR)

(72) Inventors: Cheol Hun Cho, Hwaseong (KR); Ju Tae Song, Hwaseong (KR); Woo Jin Shin, Incheon (KR); Sung Woo Choi, Gimpo (KR)

(73) Assignee: Hyundai Motor Company, Seoul (KR)

( * ) Notice: Subject to any disclaimer, the term of this patent is extended or adjusted under 35 U.S.C. 154(b) by 17 days.

(21) Appl. No.: 15/334,312

(22) Filed: Oct. 26, 2016

(65) Prior Publication Data

US 2017/0292482 A1    Oct. 12, 2017

(30) Foreign Application Priority Data

Apr. 8, 2016  (KR) .......................... 10-2016-0043219

(51) Int. Cl.
| | |
|---|---|
| *B01D 35/16* | (2006.01) |
| *F02M 37/22* | (2006.01) |
| *B01D 35/00* | (2006.01) |
| *B01D 35/30* | (2006.01) |

(52) U.S. Cl.
CPC ......... *F02M 37/221* (2013.01); *B01D 35/005* (2013.01); *B01D 35/30* (2013.01); *B01D 35/16* (2013.01)

(58) Field of Classification Search
CPC ...... B01D 35/30; B01D 35/16; B01D 35/005; F02M 37/221
See application file for complete search history.

(56) References Cited

U.S. PATENT DOCUMENTS 4,855,041 A * 8/1989 Church .............. B01D 17/0214
                                                 137/203
2005/0161386 A1    7/2005 Gustafson et al.

FOREIGN PATENT DOCUMENTS

| JP | H11-57340 A   | 3/1999 |
|----|---------------|--------|
| JP | 2004-340208 A | 12/2004 |
| JP | 2009-108804 A | 5/2009 |
| KR | 94-12860      | 6/1994 |
| KR | 2002-0083393 A | 11/2002 |
| KR | 20-0328760 Y1 | 10/2003 |

* cited by examiner

*Primary Examiner* — Thomas M Lithgow
(74) *Attorney, Agent, or Firm* — Mintz Levin Cohn Ferris Glovsky and Popeo, P.C.; Peter F. Corless

(57) ABSTRACT

A diesel fuel filter for removing foreign substances and water contained in fuel used in a high-pressure fuel pump upon lubricating and cooling the high-pressure fuel pump is provided. The diesel fuel filter includes a lower cap for draining water including a double-lock cover and a double-lock pin to provide a double-lock structure to prevent fuel leakage caused by unfastening of the lower cap due to impact or vibration during driving of a vehicle.

6 Claims, 5 Drawing Sheets

DIESEL FUEL FILTER FOR VEHICLE

CROSS-REFERENCE TO RELATED APPLICATION

This application claims under 35 U.S.C. § 119(a) the benefit of priority to Korean Patent Application No. 10-2016-0043219 filed on Apr. 8, 2016, the entire contents of which are incorporated herein by reference.

BACKGROUND (a) Technical Field

The present disclosure relates to a diesel fuel filter for a vehicle, and more particularly, to a diesel fuel filter which removes foreign substances or water contained in diesel fuel used in a high-pressure fuel pump upon lubricating and cooling the high-pressure fuel pump.

(b) Background Art

Generally, a diesel engine is used in various fields associated with industries, vessels, vehicles, and so on because there are advantages such as high thermal efficiency and low fuel cost. In such a diesel engine, advances such as enhancement of output power performance and decrease of exhaust gas have been realized in accordance with improvement of a fuel injection method or an engine revolution method. As a result, application scope and object of the diesel engine are increasing.

Furthermore, diesel fuel used in the diesel engine contains foreign substances and water, and thus, a filtering process for removing foreign substances and water is required. Accordingly, a fuel filter is used to filter diesel fuel. It may be possible to prevent damage and breakdown of the diesel engine by foreign substances by supplying pure fuel from the fuel filter to the diesel engine. Since only pure fuel burns, complete combustion is accomplished and, thus, exhaust gas generated by incomplete combustion is minimized. Accordingly, environmental pollution caused by exhaust gas may be reduced. Such a diesel fuel filter filters out foreign substances contained in diesel fuel, and discharges water contained in diesel fuel after separating water from diesel fuel.

Furthermore, the diesel fuel filter functions as a heater heating diesel fuel at low temperature to prevent problems in starting a vehicle and supplying diesel fuel in winter (e.g., colder temperatures) when diesel fuel is solidified by paraffin. Typically, the diesel fuel filter includes a filter cartridge that filters fuel pumped from a fuel tank to the diesel engine, a filter housing, a filter head disposed at a top of the filter housing to guide fuel pumped from the fuel tank to the diesel engine to pass through the filter cartridge, a heater installed between the filter head and filter cartridge, to heat fuel pumped from the fuel tank to the diesel engine to prevent fuel from being solidified in winter, and so on.

Meanwhile, as shown in FIG. 5 of the related art, a water tank 110 that stores water separated from fuel is coupled to a lower part of a filter assembly 100. The water stored in the water tank 110 is discharged to an outside after unfastening a lower cap 120. In such a conventional diesel fuel filter, however, the lower cap 120 is coupled by a simple fastening structure, and thus, the lower cap 120 may be easily unfastened due to impact during transport or vibration fatigue under severe conditions. Accordingly, a fuel leakage may disadvantageously occur.

The above information disclosed in this section is merely for enhancement of understanding of the background of the invention and therefore it may contain information that does not form the prior art that is already known in this country to a person of ordinary skill in the art.

SUMMARY

The present invention provides a diesel fuel filter for a vehicle, in which a lower cap for draining water includes a double-lock cover and a double-lock pin to provide a double-lock structure of a new type to solve the problem of the lower cap being unfastened caused by impact or vibration during driving of vehicles, thereby being capable of avoiding field claims and securing field quality in accordance with complete prevention of fuel leakage due to unfastening of the lower cap.

In one aspect, the present invention provides a diesel fuel filter for a vehicle that may include a filter assembly configured to remove foreign substances or water in fuel, a lower cap through which water is drained, the lower cap being coupled to a lower discharge part of the filter assembly, a double-lock cover engaged with the lower cap with a gear structure to prevent unfastening of the lower cap, the double-lock cover being coupled to the lower discharge part of the filter assembly, and a double-lock pin that locks the double-lock cover, the double-lock pin being coupled to both the double-lock cover and the lower discharge part of the filter assembly.

In an exemplary embodiment, the lower cap may include a cap gear part formed on a rim of a bottom surface of the lower cap, and the double-lock cover may include a cover gear part formed on a rim of a top surface of a step formed inwards at a lower end of the double-lock cover, to constrain rotation of the lower cap through engagement between the cap gear part and the cover gear part. In addition, each of the cap gear part and cover gear part may include teeth having a right-angled triangular shape, and rotation of the lower cap in an unfastening direction may be prevented by matching or corresponding between facing vertical sides of the engaged teeth of the cap gear part and cover gear part.

Further, the double-lock cover may have a cup shape to enclose the entirety of the lower discharge part including the lower cap. The double-lock cover may have a cup shape to cover the whole lower discharge part including the lower cap, and the double-lock pin may have a "C" shape and lock the double-lock cover using parallel pin parts engaged with both pin holes (e.g., apertures or bores) of the double-lock cover and pin grooves of the lower discharge part.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
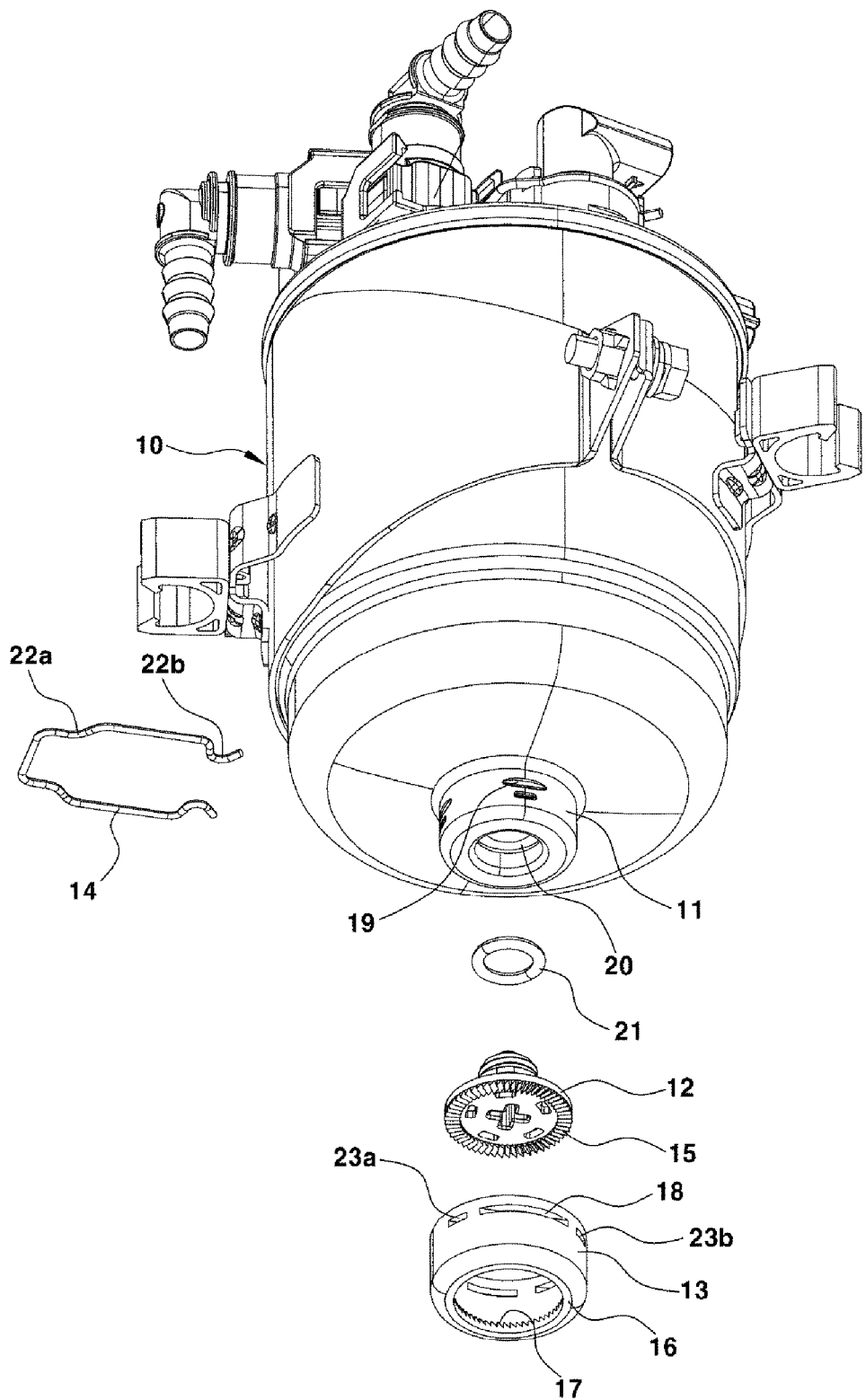
FIG. 1 is a detailed perspective view illustrating a lower cap and a double-lock cover in a diesel fuel filter for a vehicle according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below.

Figure 2:
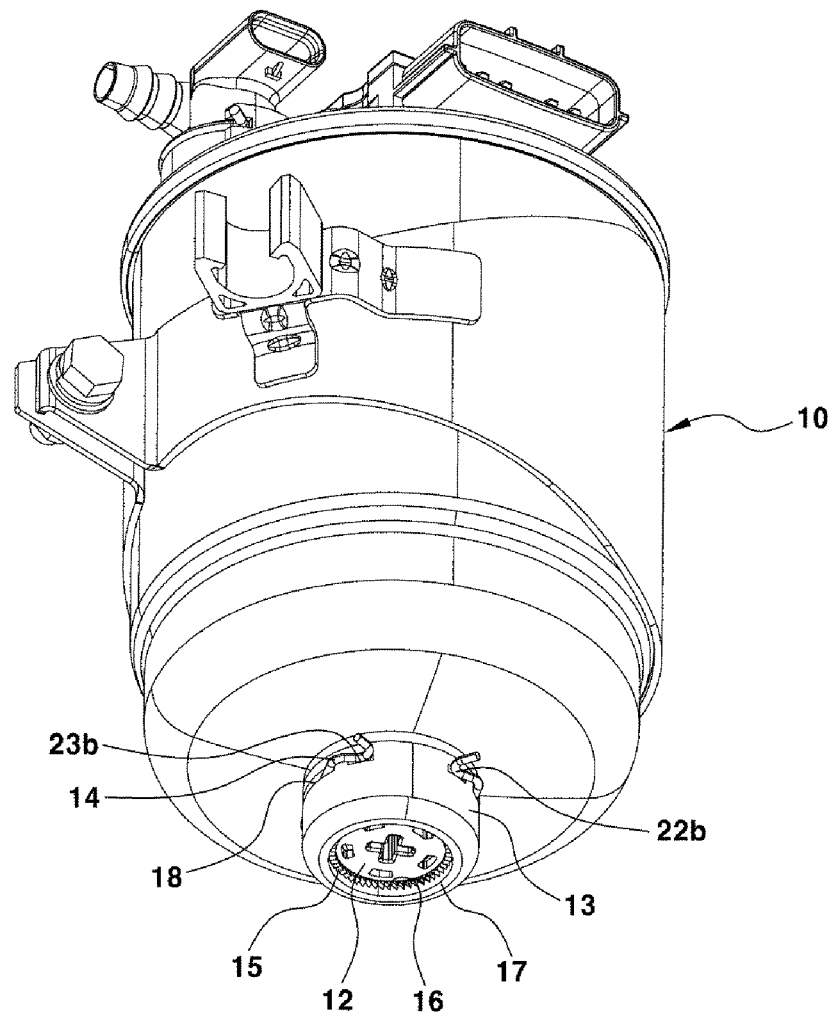
FIG. 2 is an assembled perspective view illustrating the lower cap and double-lock cover in the diesel fuel filter for the vehicle according to the exemplary embodiment of the present invention.
Figure 3:
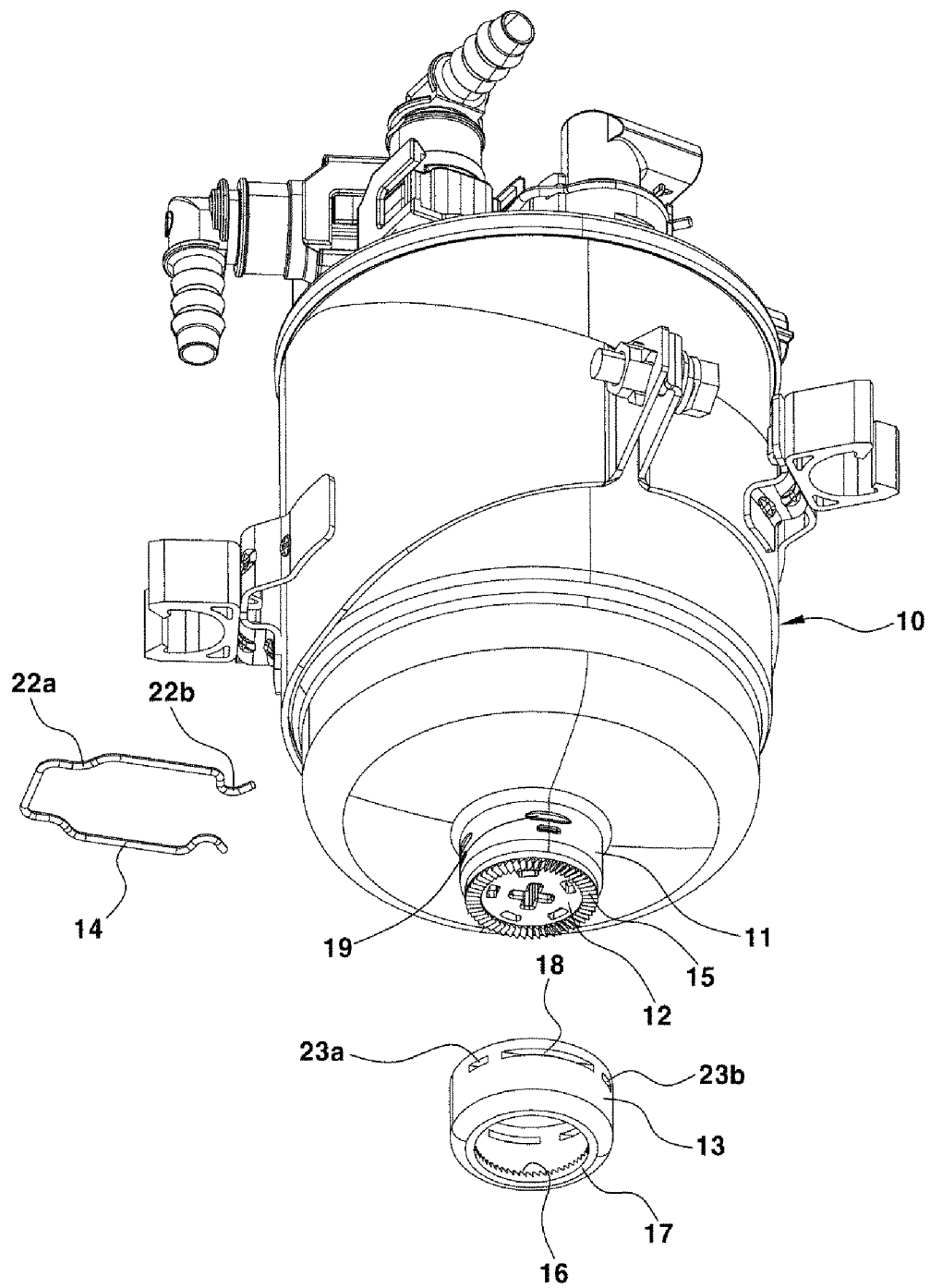
FIG. 3 is a perspective view illustrating a state prior to assembly of the double-lock cover and double-lock pin in the diesel fuel filter for the vehicle according to the exemplary embodiment of the present invention.

FIG. 1 is a detailed perspective view illustrating a lower cap and a double-lock cover in a diesel fuel filter for a vehicle according to an exemplary embodiment of the present invention. FIG. 2 is an assembled perspective view illustrating the lower cap and double-lock cover in the diesel fuel filter for the vehicle according to the exemplary embodiment of the present invention. FIG. 3 is a perspective view illustrating a state prior to assembly of the double-lock cover and double-lock pin in the diesel fuel filter for the vehicle according to the exemplary embodiment of the present invention.

As shown in FIGS. 1 to 3, the diesel fuel filter for the vehicle may include the double-lock cover and double-lock pin, which may be coupled to the lower cap to prevent unfastening of the lower cap caused by impact or vibration, thereby solving a fuel leakage problem. Accordingly, the diesel fuel filter for the vehicle may include a filter assembly 10 configured to remove foreign substances or water contained in fuel.

Particularly, the filter assembly 10 may be configured to remove foreign substances or water contained in fuel using a cartridge mounted in the filter assembly 10. An inner structure and functions of the filter assembly 10 are the same as those of a conventional filter assembly, and thus detailed explanation thereof will be omitted. Additionally, a lower discharge part 11, that is, a drain passage of water, may be formed at a lower end of the filter assembly 10. The lower discharge part 11 may be coupled to the lower cap 12, which will be described below, in a fastening structure. Slit-shaped pin grooves 19 may be formed at opposite sides of an outer circumferential surface of the lower discharge part 11. The double-lock pin 14, which will be described below, may be engaged with the pin grooves 19 in a fitted manner.

The lower cap 12 further included in the diesel fuel filter may be configured to drain water (e.g., water may be drained through the lower cap 12). The lower cap 12 may be coupled to the lower discharge part 11 formed at the lower end of the filter assembly 10 to open and close the lower discharge part 11. The lower cap 12 may be fastened in a threaded manner (e.g., by a threaded engagement) to an inner circumferential surface of a lower cap guide 20 mounted in the lower discharge part 11. Further, a lower cap seal 21 may be disposed between the lower cap 12 and a bottom surface of the lower cap guide 20 to maintain a hermetic seal.

The double-lock cover 13 further included in the diesel fuel filter for the vehicle may be configured to prevent unfastening of the lower cap 12. In particular, the double-lock cover 13 may have a circular cup shape (e.g., half spherical shape) enclosing the lower discharge part 11 including the lower cap 12 having an open bottom. A step 16 or protrusion may be formed along an inner circumferential surface of a lower end of the double-lock cover 13. The step 16 may be extended horizontally (e.g., around the circumference of the double-lock cover 13) while having a uniform width. Additionally, slit-shaped horizontal pin holes 18 (e.g., apertures or bores) may also be formed at an upper portion of the double-lock cover 13. The pin holes 18 may be disposed at opposite sides of circumference of the double-lock cover 13 to form a symmetric structure.

Further, bending part fitting apertures 23a and 23b may be formed in parallel at front and rear ends of each pin hole 18 formed at the double-lock cover 13, respectively. In particular, the bending part fitting apertures 23a and 23b may be disposed at opposite sides of circumference of the double-lock cover 13 to form a symmetric structure. Accordingly, the double-lock cover 13 may be concentrically arranged around the lower discharge part 11 of the filter assembly 10. Particularly, the double-lock cover 13 may be supported by the double-lock pin 14 coupled to the lower discharge part 11 using the pin holes 18 and the bending part fitting apertures 23a and 23b. A mounting structure for the double-lock cover 13 will be described below.

The double-lock pin 14 further included in the diesel fuel filter for the vehicle may be configured to lock the double-lock cover 13. The double-lock pin 14 may have a structure bent into a "C" shape and may have parallel pin parts. Bending parts 22a and 22b, each having an inwardly bent structure may be formed at front and rear ends of each pin part, respectively. The double-lock pin 14 may be engaged with both the lower discharge part 11 of the filter assembly 10 and the double-lock cover 13 to lock the double-lock cover 13.

For example, the double-lock cover 13 may be concentrically arranged around the lower discharge part 11 of the filter assembly 10. Accordingly, the double-lock pin 14 may be laterally fitted to engage the parallel pin parts thereof with corresponding ones of the opposite pin holes 18 of the double-lock cover 13 and corresponding ones of the opposite pin grooves 19 of the lower discharge part 11, respectively, in a fitted manner, under the condition that the corresponding pin holes 18 and pin grooves 19 are aligned with each other.

Particularly, the bending parts 22a and 22b formed at the front and rear ends of the double-lock pin 14 may be fitted in the bending part fitting apertures 23a and 23b formed at the front and rear ends of each pin hole 18 of the double-lock cover 13 in a seated manner Accordingly, the double-lock cover 13 may be locked while being supported by the lower discharge part 11 using the double-lock pin 14 fitted in the opposite pin grooves 19 of the lower discharge part 11.

Figure 4A:
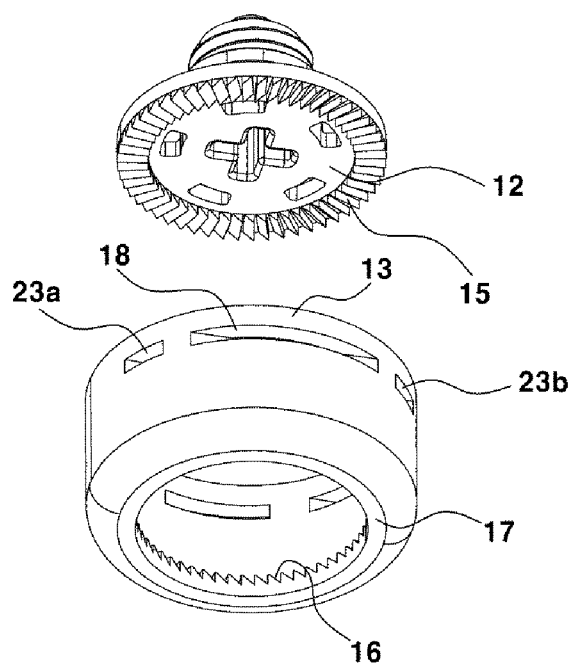
FIGS. 4A and 4B are perspective views illustrating gear matching structures of the lower cap and double-lock cover in the diesel fuel filter for the vehicle according to the exemplary embodiment of the present invention.
Figure 4B:
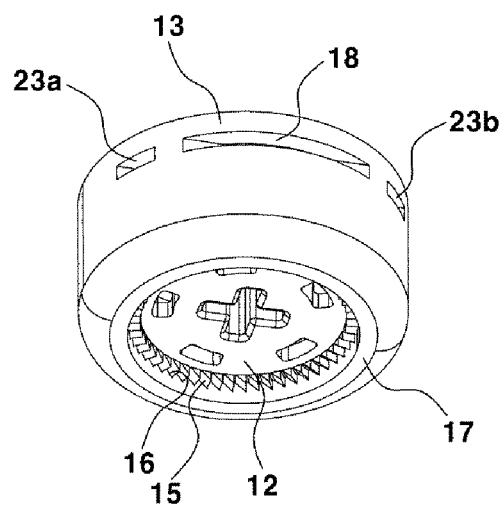
Figure 5:
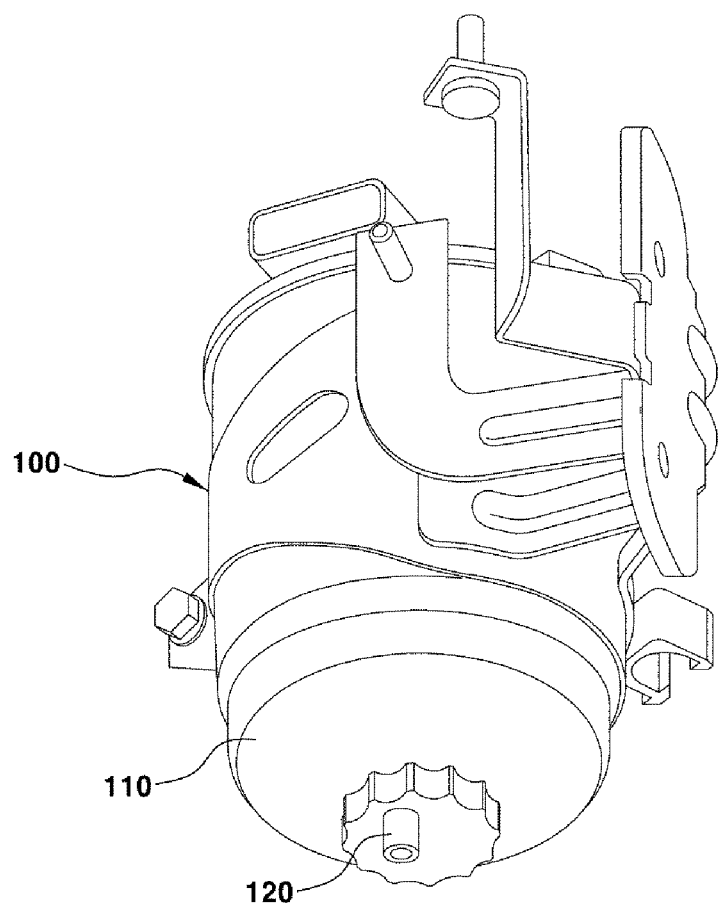
FIG. 5 is a perspective view illustrating a conventional diesel fuel filter for a vehicle according to the related art.

FIGS. 4A and 4B are perspective views illustrating gear matching structures of the lower cap and double-lock cover in the diesel fuel filter for the vehicle according to the exemplary embodiment of the present invention. As shown in FIGS. 4A and 4B, the lower cap 12 and the double-lock cover 13 may be engaged with each other by a gear-shaped engagement structure. Particularly, a cap gear part 15 may be formed on a rim (e.g., circumference) of a bottom surface of the lower cap 12. Additionally, a cover gear part 17 may be formed on a rim (e.g., circumference) of a top surface of the step 16 formed inwards at the lower end of the double-lock cover 13.

When the double-lock cover 13 is coupled to the lower discharge part 11, the cover gear part 17 may be engaged with the cap gear part 15 of the lower cap 12. Accordingly, rotation of the lower cap 12 may be constrained by engagement between the cap gear part 15 and the cover gear part 17. In other words, in spite of external impact or repeated vibration, the lower cap 12 may not be unfastened due to tooth matching (e.g., tooth alignment). Each of the cap gear part 15 and the cover gear part 17 may have teeth having a right-angled triangular shape. In particular, rotation of the lower cap 12 in an unfastening direction may be prevented through matching or alignment between facing vertical sides of the engaged teeth of the cap gear part 15 and cover gear part 17.

Upon assembly of the diesel fuel filter, the lower cap 12 may first be coupled to the lower discharge part 11 of the filter assembly 10 in a thread fastening manner The lower discharge part 11 having the lower cap 12 may be covered with the double-lock cover 13 to engage the cap gear part 15 of the lower cap 12 with the cover gear part 17 of the double-lock cover 13. Subsequently, the double-lock pin 14 may be laterally fitted around the double-lock cover 13 to engage the double-lock pin 14 with the pin holes 18 and bending part fitting apertures 23a and 23b of the double-lock cover 13. At the same time, the double-lock pin 14 may also be engaged with the pin grooves 19 of the lower discharge part 11. Thus, the double-lock cover 13 is locked. Accordingly, it may be possible to prevent the lower cap 12 covering the lower discharge part 11 of the filter assembly 10 from being unfastened in spite of external impact or repeated vibration through tooth engagement between the lower cap 12 and the double-lock cover 13 and fastening force of the double-lock pin 14 for locking the double-lock cover 13.

As apparent from the above description, in accordance with the present invention, gear structures may be applied to matching parts of the lower cap and double-lock cover to prevent unfastening of the lower cap. Accordingly, it may be possible to solve fuel leakage caused by the unfastening of the lower cap occurring due to impact during transport, repeated vibration fatigue under severe conditions, or vibration during driving of the vehicle. Additionally, it may be possible to prevent unfastening of the lower cap caused by various situations such as impact condition during transport, misassembly during after customer service, vibration during driving of the vehicle, mismatch between a guide and the lower cap by frequent assembly, and so on, thereby being capable of avoiding field claims and securing field quality to improve customer satisfaction.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A diesel fuel filter for vehicles, comprising:
   a filter assembly that removes foreign substances or water in fuel;
   a lower cap through which water is drained, the lower cap being coupled to a lower discharge part of the filter assembly;
   a double-lock cover engaged with the lower cap with a gear structure to prevent unfastening of the lower cap, the double-lock cover being coupled to the lower discharge part of the filter assembly; and
   a double-lock pin that locks the double-lock cover, the double-lock pin being coupled to both the double-lock cover and the lower discharge part of the filter assembly.

2. The diesel fuel filter of claim 1, wherein the lower cap includes a cap gear part formed on a rim of a bottom surface of the lower cap, and the double-lock cover includes a cover gear part formed on a rim of a top surface of a step formed inwards at a lower end of the double-lock cover, to constrain rotation of the lower cap through engagement between the cap gear part and the cover gear part.

3. The diesel fuel filter of claim 2, wherein each of the cap gear part and cover gear part includes teeth having a right-angled triangular shape and rotation of the lower cap in an unfastening direction is prevented by aligning facing vertical sides of the engaged teeth of the cap gear part and cover gear part.

4. The diesel fuel filter of claim 1, wherein the double-lock cover has a cup shape to enclose the lower discharge part including the lower cap.

5. The diesel fuel filter of claim 1, wherein the double-lock pin has a C shape and includes parallel pin parts, and the pin parts are engaged with both pin holes of the double-lock cover and pin grooves of the lower discharge part in a fitted manner, to lock the double-lock cover.

6. The diesel fuel filter of claim 1, further comprising:
   pin holes formed at an upper portion of the double-lock cover and disposed at opposite sides of the circumference of the double-lock cover; and bending part fitting apertures formed in parallel at front and rear ends of each pin hole.

* * * * *